United States Patent
Beau et al.

[11] Patent Number: 5,971,013
[45] Date of Patent: Oct. 26, 1999

[54] PNEUMATIC REGULATING PRESSURE REDUCING VALVE

[75] Inventors: Jean François Beau, St Ouen L'Aumône; Gilles Simon, Aubergenville, both of France

[73] Assignee: Aerospatiale Société National Industrielle, Paris Cedex, France

[21] Appl. No.: 09/147,109

[22] PCT Filed: Feb. 6, 1998

[86] PCT No.: PCT/FR98/00228

§ 371 Date: Oct. 7, 1998

§ 102(e) Date: Oct. 7, 1998

[87] PCT Pub. No.: WO98/35278

PCT Pub. Date: Aug. 13, 1998

[30] Foreign Application Priority Data

Feb. 10, 1997 [FR] France ................................. 97/01482

[51] Int. Cl.⁶ ................................................. G05D 16/06
[52] U.S. Cl. ................................ 137/505.37; 137/505
[58] Field of Search ........................... 137/454.8, 505.37, 137/505; 251/337

[56] References Cited

U.S. PATENT DOCUMENTS

| 2,318,721 | 5/1943 | Siver | 137/454.5 |
| 2,718,237 | 9/1955 | Matasovic | 137/505.37 |

FOREIGN PATENT DOCUMENTS

| 2 294 480 | 7/1976 | France . |
| 2567237 | 1/1986 | France . |
| 2106613 | 4/1983 | United Kingdom . |
| 2265968 | 10/1993 | United Kingdom . |

*Primary Examiner*—Stephen M. Hepperle
*Attorney, Agent, or Firm*—Oblon, Spivak, McClelland, Maier & Neustadt, P.C.

[57] ABSTRACT

In a pneumatic pressure-reducer, the control rod for the control valve is supported and guided by two spring washers whose radial stiffness is at least around 200 times greater than the axial stiffness. Each washer comprises internal and external annular regions connected by at least three inclined arms, separated by openings. Preferably, a restriction is formed between a region of the pressure-reducer situated downstream from the valve and a comparison chamber, the pressure of which acts on a comparison capsule connected to the rod.

13 Claims, 3 Drawing Sheets

PNEUMATIC REGULATING PRESSURE REDUCING VALVE

BACKGROUND OF THE INVENTION

1. Field of the Invention

The invention relates to a pneumatic pressure-reducer, of the type in which a comparison capsule, sensitive to the opposing actions of a compression spring and the pressure prevailing downstream from a control valve, controls the movements of the flap of the valve, by means of a movable pressure reduction control rod.

Such a device may be used in all technical fields requiring pneumatic control, notably when a particularly accurate and stable control is desired and when the presence of microparticles is undesirable. Among these fields, space applications will be cited in particular, and in no way limitatively.

2. Discussion of the Background

In a pneumatic pressure-reducer, a pressurised gas is reduced to a controlled lower pressure, by means of a valve formed from a flap pressed elastically against a seat. Movements of the flap away from the seat, providing the reduction in pressure of the gas, are controlled by a movable rod, usually mounted sliding in the body of the pressure-reducer. In order to provide the movements of the rod, the latter is connected to a comparison capsule acted on by a compression spring which tends to move the rod in the direction of opening the valve. In order to provide control, the face of the comparison capsule opposite the one acted on by the compression spring is placed in a comparison chamber situated downstream from the valve and through which the gas which escapes from the pressure-reducer usually passes.

In pneumatic pressure-reducers constituted in this way, compression of the spring which acts on the comparison capsule creates unwanted transverse forces, which in their turn cause friction between the control rod for the valve and the bearings which support it. This friction creates random control inaccuracies and forms micro-particles. For this reason, pressure-reducers of this type are not suited to certain specific applications such as space applications developed currently.

Furthermore, as a result of the comparison chamber being placed directly downstream from the valve, oscillations generated by the reduction in pressure of the gases are transmitted in full to the comparison capsule. Under certain flow conditions, this creates regulation instabilities also little suited to certain specific applications.

SUMMARY OF THE INVENTION

The object of the invention is precisely a pneumatic pressure-reducer, the original design of which provides a control which is substantially more accurate and more stable than that of existing pressure-reducers, while avoiding the formation of micro-particles under the effect of friction.

In accordance with the invention, this result is obtained by means of a pneumatic pressure-reducer, characterised by the fact that it comprises:

a body;

a main passage formed in the body and connecting a gas inlet aperture with a gas outlet aperture;

a valve having a seat formed in the main passage and a flap pressed elastically against this seat;

a movable pressure reduction control rod, guided and supported in the body by two spring washers, so as to be able to control a movement of the flap away from the seat; and a comparison capsule, movable with the rod in the direction of the said movement, under the action of an elastic means acting against a gas pressure prevailing in a comparison chamber communicating with a downstream region of the main passage, situated between the valve and the outlet aperture.

Given that, instead of being mounted sliding in the body of the pressure-reducer, the rod serving to control the valve is guided and supported by two spring washers, the friction between the rod and the body of the pressure-reducer is removed. The drawbacks entailed by this friction, that is to say notably the random control inaccuracies and the formation of microparticles, are therefore also removed.

Mounting of the control rod for the valve in the body of the pressure-reducer by means of two spring washers ensures a perfectly linear movement of the rod with respect to the flap.

As the case may be, the two spring washers may both be situated between the comparison capsule and the valve, or respectively on either side of the comparison capsule.

In one preferential embodiment of the invention, each spring washer comprises an internal annular region fixed on the rod, an external annular region fixed in the body and at least three arms connecting these internal and external annular regions, and separated from one another by openings. This configuration gives the spring washers a great axial flexibility and a great radial rigidity, which makes it possible to provide radial guidance of the rod effectively, without hampering its axial movement.

In order to further improve the axial flexibility of the spring washers, the external annular region of each one is fixed to the body of the pressure-reducer in areas distant from the arms.

In a particularly advantageous arrangement, the arms of each spring washer are all inclined circumferentially in the same direction and by the same angle, with respect to a radial direction.

Generally, each spring washer has preferably a radial stiffness at least around 200 times greater than its axial stiffness.

Advantageously, the comparison chamber is connected by a restriction to the region of the main passage situated downstream from the valve. The oscillations generated in this region by the reduction in pressure of the gases are therefore damped and the regulation instabilities are considerably reduced.

In this case, a metallic sealing bellows may be interposed between the rod and an internal sleeve integral with the body. The restriction is then formed in a partition which separates the comparison chamber from the said downstream region of the main passage.

In a variant embodiment of the invention, a gas-tight partition separates the comparison chamber from the region of the main passage situated downstream from the valve. The restriction is then formed between the rod and a projecting part of an internal sleeve, integral with the body.

As the case may be, the rod and the comparison capsule may be integral with one another or formed from distinct components. In the latter case, the rod has a substantially hemispherical end against which a flat surface of the comparison capsule is held in contact, under the joint action of the elastic means and each spring washer.

Advantageously, the friction may also be removed between the flap and the seat of the valve. To this end, the flap is then supported and guided in the body of the pressure-reducer by at least one other spring washer similar to the spring washers described previously.

BRIEF DESCRIPTION OF THE DRAWINGS

By way of non-limitative examples, different embodiments of the invention will now be described, with reference to the accompanying drawings, in which.

DETAILED DESCRIPTION OF THE PREFERRED EMBODIMENTS

Figure 1:
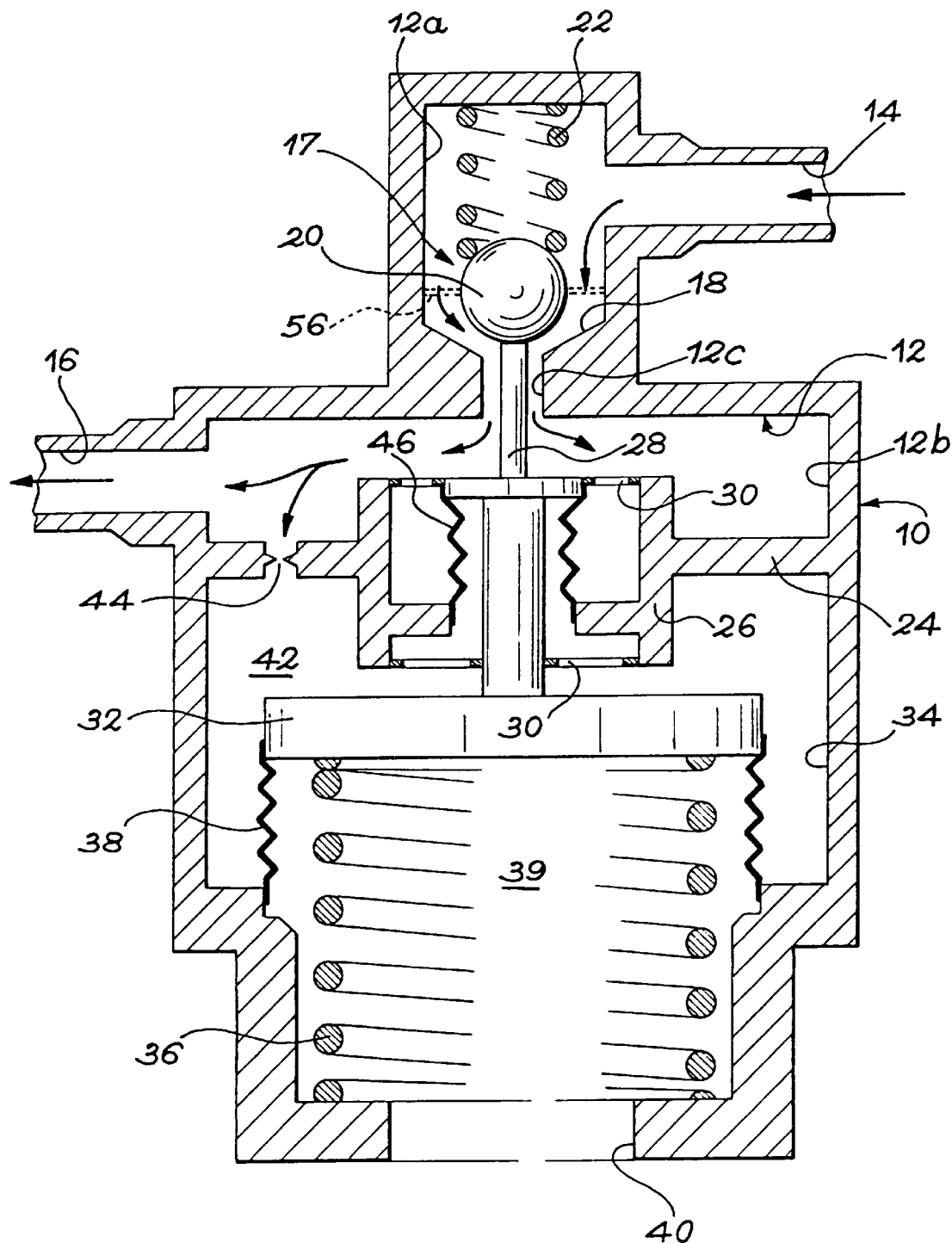
FIG. 1 is a schematic longitudinal cross-section of a pneumatic pressure-reducer according to a first embodiment of the invention.

In FIG. 1, the reference 10 designates the body of a pneumatic pressure-reducer according to a first embodiment of the invention. The body 10 of the pressure-reducer may have any shape, without departing from the scope of the invention. The body 10 of the pressure-reducer is made in several parts, assembled with one another according to known techniques.

The body 10 of the pressure-reducer defines internally a main passage 12, a first end of which opens to the outside through a gas inlet aperture 14 and the opposite end of which opens to the outside through a gas outlet aperture 16. The active parts of the pressure-reducer, which will be described later, have the effect of reducing the pressure of the gas under pressure admitted by the inlet aperture 14 and of controlling its pressure, in order that the gas delivered by the outlet aperture 16 is at a reduced pressure, the value of which remains relatively constant whatever the inlet pressure.

In the embodiment illustrated in FIG. 1, the main passage 12 comprises a first cylindrical part 12a, having a relatively small diameter, into which the inlet aperture 14 opens radially, and a second cylindrical part 12b, having a relatively large diameter, into which the outlet aperture 16 opens radially. These two parts 12a and 12b of the main passage 12 communicate with one another through a third cylindrical part 12c, having a smaller diameter. The three parts 12a, 12b and 12c of the main passage 12 are disposed coaxially.

A control valve 17 is placed in the main passage 12. This valve 17 comprises a valve seat 18, for example of frustoconical form, formed between the parts 12a and 12c of the main passage 12, and a flap 20, housed in the first cylindrical part 12a of the main passage 12. The flap 20 is pressed elastically towards the valve seat 18 by a helical compression spring 22 housed in the part 12a of the main passage 12. In the embodiment illustrated in FIG. 1, the flap 20 is constituted by a ball. It may, however, take another form, without departing from the scope of the invention.

On the opposite side from the part 12c of the main passage 12, the part 12b of this same main passage is closed by a partition 24 which forms an integral part of the body 10 of the pressure-reducer. This partition 24 is integral with a sleeve 26, disposed coaxially inside the cylindrical part 12b of the main passage 12. The sleeve 26 is traversed along its axis by a movable pressure reduction control rod 28. More precisely, the rod 28 is supported and guided in the sleeve 26 by two spring washers 30, so as to be able to move parallel to its axis, while being centred on this axis. In the embodiment illustrated in FIG. 1, a spring washer 30 is interposed between the rod 28 and each end of the sleeve 26.

As illustrated in FIG. 1, one end of the rod 28 traverses the cylindrical part 12c of the main passage 12, so as to be able to come to rest against the flap 20 and move the latter away from the seat 18. At its opposite end, the rod 28 is integral with a comparison capsule 32, in the form of a piston. This comparison capsule 32 is housed in a cylindrical cavity 34 formed inside the body 10, on the other side of the partition 24 compared with the cylindrical part 12b of the main passage 12, and coaxially with this part 12b.

A helical compression spring 36, centred on the axis common to the different parts of the main passage 12 and the rod 28, is interposed between the body 10 of the pressure-reducer and the face of the capsule 32 opposite the rod 28. This spring 36 enables the rod 28 to control a movement of the flap 20 away from the seat 18.

The cavity 34, in which the comparison capsule 32 is accommodated, is separated into two chambers by a sealing bellows 38, a first end of which is fixed in a gas-tight fashion onto the peripheral edge of the capsule 32 and the opposite end of which is fixed in a gas-tight fashion to the body 10 of the pressure-reducer. A first 39 of these chambers, in which the spring 36 is situated, is set to the external pressure by means of a circular opening 40 made in the body 10 along the axis of the rod 28. The second chamber, formed around the sealing bellows 38 and between the capsule 32 and the wall 24, constitutes a comparison chamber 42. This comparison chamber 42 communicates with the part 12b of the main passage 12, situated downstream from the valve, through a restriction 44 constituted by a regulating nozzle formed in a hole going through the wall 24.

As will be seen in more detail later, the spring washers 30 are cut-away washers, in which openings are formed. In order that the restriction 44 constitutes the only possible communication between the comparison chamber 42 and the part 12b of the main passage 12, a metallic sealing bellows 46 is therefore provided between the rod 28 and the sleeve 26. More precisely, a first end of the metallic sealing bellows 46 is fixed to the interior of the sleeve 26 and its opposite end is fixed on the rod 28. The metallic sealing bellows 46 is situated, in this case, between the two spring washers 30.

Figure 2:
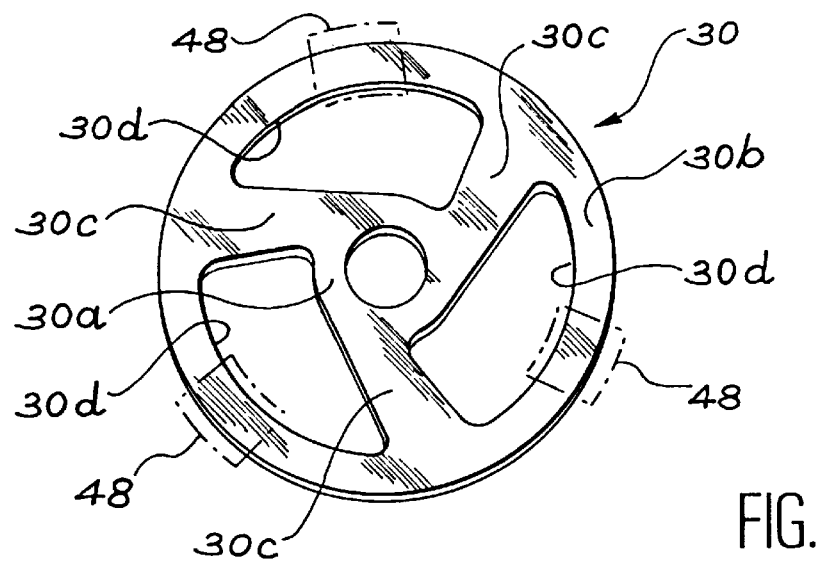
FIG. 2 is a front view, to a larger scale, of a spring washer used in the pressure-reducer of FIG. 1.

As illustrated in more detail in FIG. 2, each spring washer 30, at rest, when not deformed, comes in the form of a flat plate, made for example of spring steel. Each spring washer 30 comprises an internal annular region 30a, designed to be fixed on the rod 28, and an external annular region 30b, designed to be fixed in the sleeve 26 of the body of the pressure-reducer. The internal annular region 30a and the external annular region 30b are interconnected by at least three arms 30c, separated by openings 30d.

More precisely, the internal annular region 30a is fixed on the rod 28 by any appropriate means such as welding or crimping.

Furthermore, the external annular region 30b of each spring washer 30 is fixed in the sleeve 26 at limited locations, corresponding to areas 48 delimited by dot-and-dash lines in FIG. 2. The number of fixing areas 48 is identical to the number of arms 30c and openings 30d and these areas are situated in the parts of the external annular region 30b furthest away from the arms 30c. In these areas 48, the fixing of the external annular region 30b in the sleeve 26 may be performed by any appropriate means such as welding or crimping.

Moreover, the arms 30c of each spring washer 30 are all inclined circumferentially in the same direction and by the same angle, with respect to a radial direction of the washer.

By virtue of all the characteristics which have just been described, the spring washers 30 have great axial flexibility, while having a radial stiffness which is sufficiently high to ensure an effective centring of the rod 28. More precisely, each spring washer 30 has a radial stiffness at least around 200 times greater than its axial stiffness.

The pneumatic pressure-reducer which has just been described with reference to FIGS. 1 and 2 is made so that any friction is removed between the pressure reduction control rod 28 and the body 10 of the pressure-reducer. This characteristic, obtained by replacing the conventional sliding motion with at least one spring washer of the same type as the washer 30 in FIG. 2, makes it possible to remove the random control inaccuracies usually generated by friction, as well as the micro-particles formed by the latter.

Furthermore, the presence of the restriction 44 in the partition 24 and the addition of the metallic bellows 46 make it possible to avoid the pressure which prevails in the comparison chamber 42 being subject to the relatively high-frequency oscillations generated by the reduction in pressure of the gases downstream from the valve 17. The control instabilities which generally ensue from these oscillations are therefore also advantageously reduced.

Figure 3:
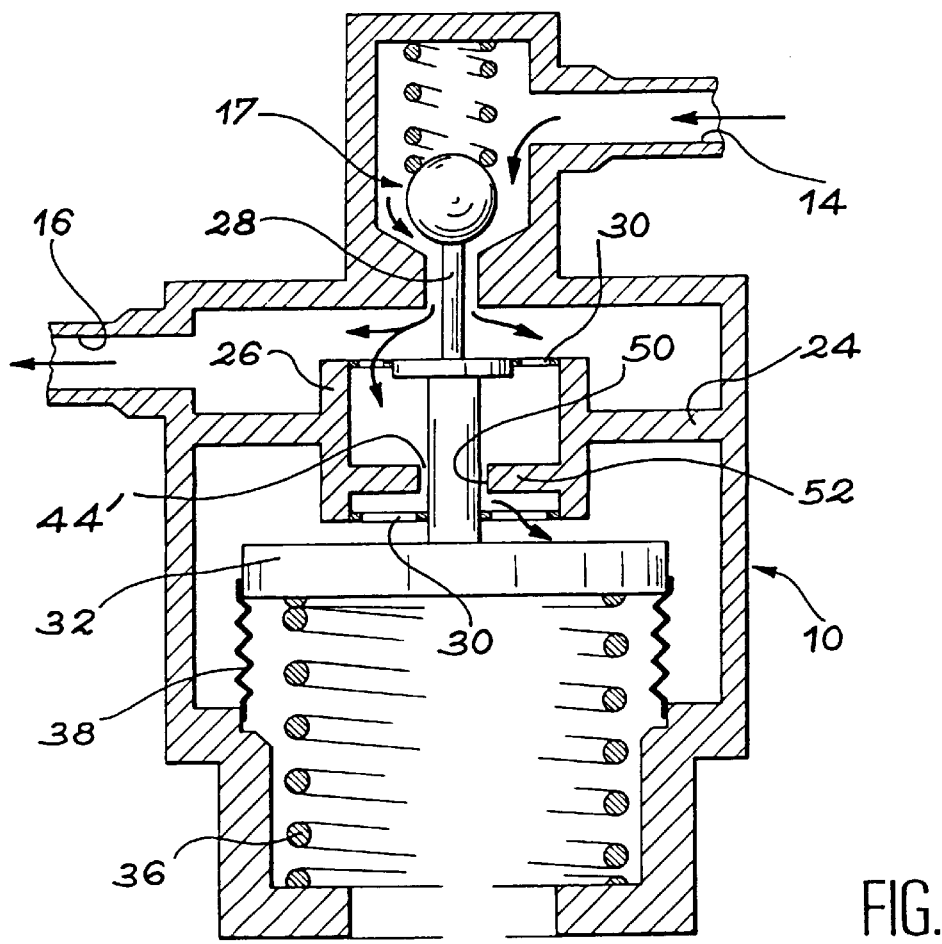
FIG. 3 is a cross-section comparable to FIG. 1, illustrating a second embodiment of the invention.

In a second embodiment of the invention illustrated in FIG. 3, the restriction 44 formed in the partition 24 is removed, as is the metallic bellows 46. In this case, the partition 24 is therefore gas-tight and the pressure prevailing downstream from the valve 17 is admitted into the comparison chamber 42 through a restriction 44' formed directly between the body 10 of the pressure-reducer and the pressure reduction control rod 28. More precisely, the restriction 44' is then constituted by an annular gap existing between the rod 28 and a bore 50 made in a radial partition 52 which projects towards the rod 28, from the sleeve 26, between the spring washers 30.

Figure 4:
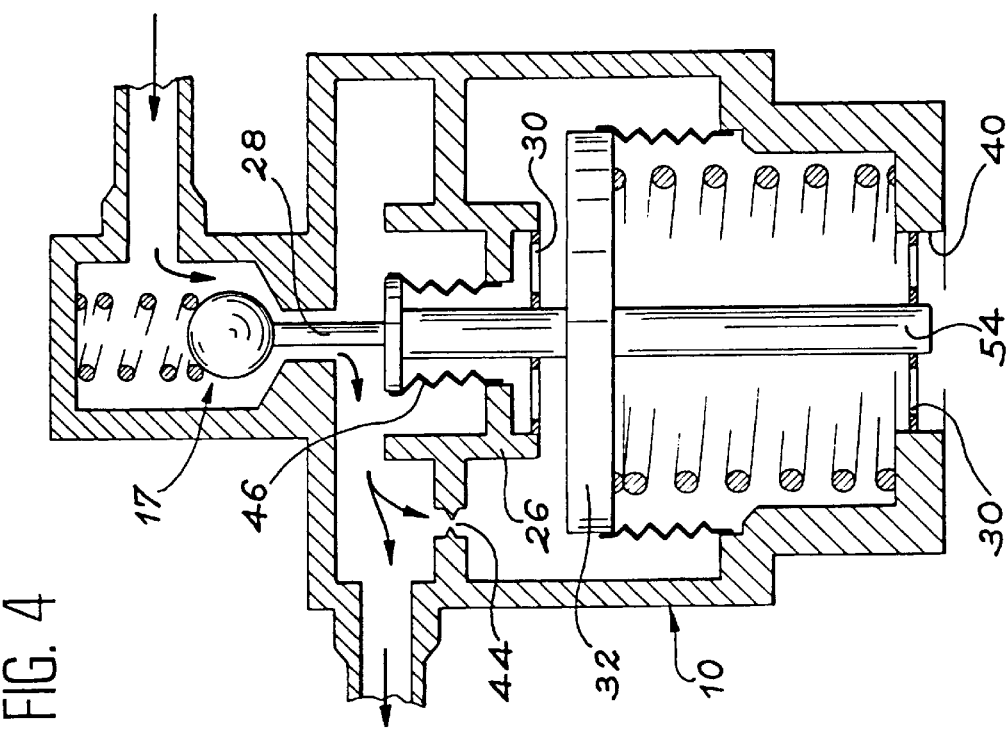
FIG. 4 is a cross-section comparable to FIGS. 1 and 3,. illustrating a variant embodiment of the invention.

FIG. 4 depicts a variant of the first embodiment of the invention described previously with reference to FIG. 1.

This variant is distinguished essentially by the fact that the spring washer interposed between the rod 28 and the end of the sleeve 26 closest to the seat 18 is removed and replaced by a spring washer 30, interposed between the edge of the circular opening 40, made in the body 10 of the pressure-reducer, and an extension 54 of the rod 28, on the opposite side of the comparison capsule 32 compared with this rod.

Compared with the embodiment illustrated in FIG. 1, this variant makes it possible to improve the axial guidance of the rod 28, by virtue of the increase in distance between the two spring washers 30.

As in the first embodiment of the invention, the two spring washers 30 are made preferably in the manner which was described in detail with reference to FIG. 2.

Figure 5:
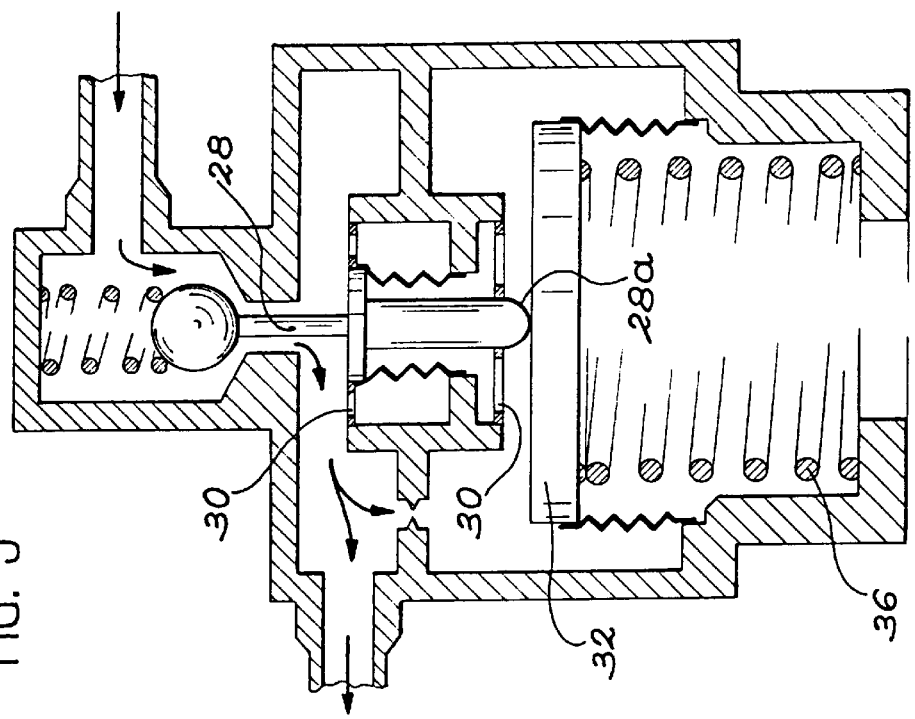
FIG. 5 is a cross-section comparable to FIGS. 1, 3 and 4, illustrating another variant embodiment of the invention.

In another variant embodiment of the invention illustrated in FIG. 5, instead of being made all in one piece as in the embodiments described previously, the rod 28 and the comparison capsule 32 constitute two distinct components.

More precisely, the comparison capsule 32 comes in the form of a flat disc whose surface turned towards the rod 28 is a flat surface. Furthermore, the end 28a of the rod 28 turned towards the comparison capsule 32 has a substantially hemispherical form.

In this case, the substantially hemispherical end 28a of the rod 28 is held permanently resting against the flat face of the comparison capsule 32 under the combined action of the springs 22 and 36 and the spring washers 30.

This variant embodiment of FIG. 5 has the advantage of allowing a possible angular displacement or an alignment fault between the rod 28 and the comparison capsule 32, without this displacement having any harmful consequence on the operation of the pressure-reducer.

As illustrated in broken lines in FIG. 1, the holding and guidance of the flap 20 inside the first part 12a of the main passage 12 may be achieved in a manner comparable to that described for the holding and guidance of the rod 28 inside the sleeve 26. More precisely, the flap 20 is then mounted in the first part 12a of the main passage 12 by means of one or two washers 56, the structure of which is comparable to that of the washers 30 described previously.

Of course, the different variants which have been described notably with reference to FIGS. 4 and 5 may be combined at will with one or other of the embodiments described with reference to FIGS. 1 and 3.

Furthermore, it will be easily understood that the form of the spring washer 30 described with reference to FIG. 2 may be subject to certain modifications without departing from the scope of the invention.

We claim:

1. A pneumatic pressure-reducer comprising:

a body;

a main passage formed in the body and connecting a gas inlet aperture with a gas outlet aperture;

a valve having a seat formed in the main passage and a flap pressed elastically against this seat;

a movable pressure reduction control rod, guided and supported in the body by two spring washers, so as to be able to control a movement of the flap away from the seat; and a comparison capsule, movable with the rod in the direction of the said movement, under the action of an elastic means acting against a gas pressure prevailing in a comparison chamber communicating with a downstream region of the main passage, situated between the valve and the outlet aperture.

2. A pneumatic pressure-reducer according to claim 1, wherein the two spring washers are placed between the comparison capsule and the valve.

3. A pneumatic pressure-reducer according to claim 1, wherein the two spring washers are placed on either side of the comparison capsule.

4. A pneumatic pressure-reducer according to claim 1, one of the preceding claims, wherein each spring washer comprises an internal annular region fixed on the rod, an external annular region fixed in the body and at least three arms connecting these internal and external annular regions, and separated by openings.

5. A pneumatic pressure-reducer according to claim 4, wherein the external annular region of the spring washer is fixed to the body in areas distant from the arms.

6. A pneumatic pressure-reducer according to claim 4, wherein the arms are all inclined circumferentially in the same direction and by the same angle, with respect to a radial direction.

7. A pneumatic pressure-reducer according to claim 1, wherein each spring washer has a radial stiffness at least around 200 times greater than its axial stiffness.

8. A pneumatic pressure-reducer according to claim 1, wherein the comparison chamber is connected to the downstream region of the main passage through a restriction.

9. A pneumatic pressure-reducer according to claim 8, wherein a metallic sealing bellows is interposed between the rod and an internal sleeve integral with the body, the restriction being formed in a partition which separates the comparison chamber from the said downstream region of the main passage.

10. A pneumatic pressure-reducer according to claim 8, wherein a gas-tight partition separates the comparison chamber from the said downstream region of the main passage, the restriction being formed between the rod and a projecting part of an internal sleeve integral with the body.

11. A pneumatic pressure-reducer according to claim 1, wherein the rod and the comparison capsule are integral with one another.

12. A pneumatic pressure-reducer according to claim 1, wherein the rod has a substantially hemispherical end against which a flat surface of the comparison capsule is held in contact, under the joint action of the elastic means and each spring washer.

13. A pneumatic pressure-reducer according to any claim 1, wherein the flap is supported and guided in the body by at least one other spring washer.

* * * * *